(12) United States Patent
Yu et al.

(10) Patent No.: US 11,645,375 B2
(45) Date of Patent: May 9, 2023

(54) AUTHORIZATION OF RESOURCE ACCESS

(71) Applicant: International Business Machines Corporation, Armonk, NY (US)

(72) Inventors: Jun Jie Yu, Shanghai (CN); Chang Lei, Shanghai (CN); Kun Yang, Beijing (CN); Zhi Yong Xue, Shanghai (CN); Jing Cai, Shanghai (CN); Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 16/143,540

(22) Filed: Sep. 27, 2018

(65) Prior Publication Data

US 2020/0104473 A1    Apr. 2, 2020

(51) Int. Cl.
*G06F 21/33* (2013.01)
*H04L 9/32* (2006.01)
*H04L 9/40* (2022.01)

(52) U.S. Cl.
CPC .......... *G06F 21/335* (2013.01); *H04L 9/3213* (2013.01); *H04L 9/3234* (2013.01); *H04L 63/102* (2013.01); *H04L 63/108* (2013.01)

(58) Field of Classification Search
None
See application file for complete search history.

(56) References Cited

U.S. PATENT DOCUMENTS

| | | |
|---|---|---|
| 8,782,411 B2 | 7/2014 | Nimashakavi et al. |
| 9,342,667 B2 | 5/2016 | Fletcher et al. |
| 9,450,939 B2 | 9/2016 | Zhou et al. |
| 9,860,234 B2 | 1/2018 | Sondhi et al. |
| 9,882,882 B2 | 1/2018 | Gupta |

(Continued)

FOREIGN PATENT DOCUMENTS

EP    2809042 A1    12/2014

OTHER PUBLICATIONS

Brainard, J. et al., Oct. 2006. Fourth-factor authentication: somebody you know. In Proceedings of the 13th ACM conference on Computer and communications security (pp. 168-178). (Year: 2006).*
Jain, A.K., et al., D., 2012. Addressing security and privacy risks in mobile applications. IT Professional, 14(5), pp. 28-33. (Year: 2012).*
Hardt, "The OAuth 2.0 Authorization Framework", Microsoft, ISSN: 2070-1721, Oct. 2012, (RFC specification: https://tools.ietf.org/html/rfc6749), 76 pages.

(Continued)

*Primary Examiner* — Luu T Pham
*Assistant Examiner* — Edward X Long
(74) *Attorney, Agent, or Firm* — Grant Johnson

(57) ABSTRACT

Embodiments of the present disclosure relate to methods, systems and computer program products for authorization of resource access. According to the method, a first token is assigned by one or more processing units to authorize a client to access at least one protected resource of a resource owner. The first token depends on an access session with the client. A second token associated with at least one long-term protected resource of the resource owner is assigned by one or more processing units to the client based on the assigning of the first token. The second token is independent from the access session. In response to receiving a request including the second token from the client, the at least one long-term protected resource is provided by one or more processing units to the client. In other embodiments, a further method and corresponding systems and computer program products are disclosed.

14 Claims, 12 Drawing Sheets

(56) References Cited

U.S. PATENT DOCUMENTS

| | | | |
|---|---|---|---|
| 11,210,648 B2* | 12/2021 | Ortiz | G06Q 20/3223 |
| 2007/0203714 A1* | 8/2007 | McEnroe | G06Q 30/0601 |
| | | | 705/26.1 |
| 2009/0205032 A1* | 8/2009 | Hinton | H04L 63/0815 |
| | | | 726/7 |
| 2013/0019295 A1 | 1/2013 | Park et al. | |
| 2013/0276086 A1* | 10/2013 | Yu | H04L 63/08 |
| | | | 726/9 |
| 2014/0026193 A1* | 1/2014 | Saxman | G06F 21/33 |
| | | | 726/4 |
| 2014/0033279 A1 | 1/2014 | Nimashakavi et al. | |
| 2015/0163215 A1 | 6/2015 | Qin | |
| 2019/0349360 A1* | 11/2019 | Yeddula | H04L 63/0807 |
| 2020/0402152 A1* | 12/2020 | Sa | G06Q 30/0601 |

OTHER PUBLICATIONS

Kumar, "OpenID Connect: Extending OAuth Based Authentication", UVdesk, Jul. 7, 2017, © Copyright 2010-2018 Webkul Software Pvt Ltd, 7 pages.

Honig et al., "OAuth Integration", JFrog, Aug. 15, 2017, https://www.jfrog.com/confluence/display/RTF/OAuth+Integration, 7 pages.

Campbell et al., "Resource Indicators for OAuth 2.0 draft-campbell-oauth-resource-indicators-00", OAuth Working Group, Mar. 2016, 8 pages.

Mell et al., "The NIST Definition of Cloud Computing", Recommendations of the National Institute of Standards and Technology, U.S. Department of Commerce, Sep. 2011, 7 pages.

\* cited by examiner

AUTHORIZATION OF RESOURCE ACCESS

BACKGROUND

The present disclosure relates to resource access, and more specifically, to methods, systems, and computer program products for authorizing resource access.

Third-party authentication and authorization for resource access is known, particularly when a dedicated third-party is responsible for the authentication and authorization of a user attempting to access and utilize specific resources through the use of a client application which does not require the user to provide his/her own personal information (e.g., password) to the client application.

As an example, OAuth is a known architecture supporting third-party authentication and authorization. OAuth is an open standard, which allows a user to provide an access token instead of the username and password to access data kept at a specific service provider by the user. Each access token authorizes one particular application to access particular resources within a certain period of time, that is, an access token is only valid for a limited period of time. As such, OAuth allows users to authorize a third-party application to access their particular resources stored at another service provider without sharing their access permission or all the resources. OAuth is characterized in that a third-party application cannot directly acquire user's password; rather, the third-party application uses an access token authorized by the user to perform access.

SUMMARY

In a first aspect, embodiments of the present disclosure provide a computer-implemented method. According to the method, a first token is assigned by one or more processing units to authorize a client to access at least one protected resource of a resource owner. The first token depends on an access session with the client. A second token associated with at least one long-term protected resource of the resource owner is assigned by one or more processing units to the client based on the assigning of the first token. The second token is independent from the access session. In response to receiving a request including the second token from the client, the at least one long-term protected resource is provided by one or more processing units to the client. In other embodiments, a further method and corresponding systems and computer program products are disclosed.

In a second aspect, embodiments of the present disclosure provide a computer-implemented method. According to the method, a first token is received by one or more processing units from an authorization system to authorize a client to access at least one protected resource of a resource owner. A first token depends on an access session between the authorization system and the client. A second token associated with at least one long-term protected resource of the resource owner is received by one or more processing units from the authorization system. The second token is independent from the access session. A request including the second token is initiated by one or more processing units to the authorization system. The at least one long-term protected resource is received by one or more processing units.

In a third aspect, embodiments of the present disclosure provide a system. The system comprises a processing unit; and a memory coupled to the processing unit and storing instructions thereon. The instructions, when executed by the processing unit, perform the method according to the above first aspect.

In a fourth aspect, embodiments of the present disclosure provide a system. The system comprises a processing unit; and a memory coupled to the processing unit and storing instructions thereon. The instructions, when executed by the processing unit, perform the method according to the above second aspect.

In a fifth aspect, embodiments of the present disclosure provide a computer program product. The computer program product comprises a computer readable storage medium having program instructions embodied therewith, the program instructions executable by a processor to cause the device to perform the method according to the above first aspect.

In a sixth aspect, embodiments of the present disclosure provide a computer program product. The computer program product comprises a computer readable storage medium having program instructions embodied therewith, the program instructions executable by a processor to cause the device to perform the method according to the above second aspect.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
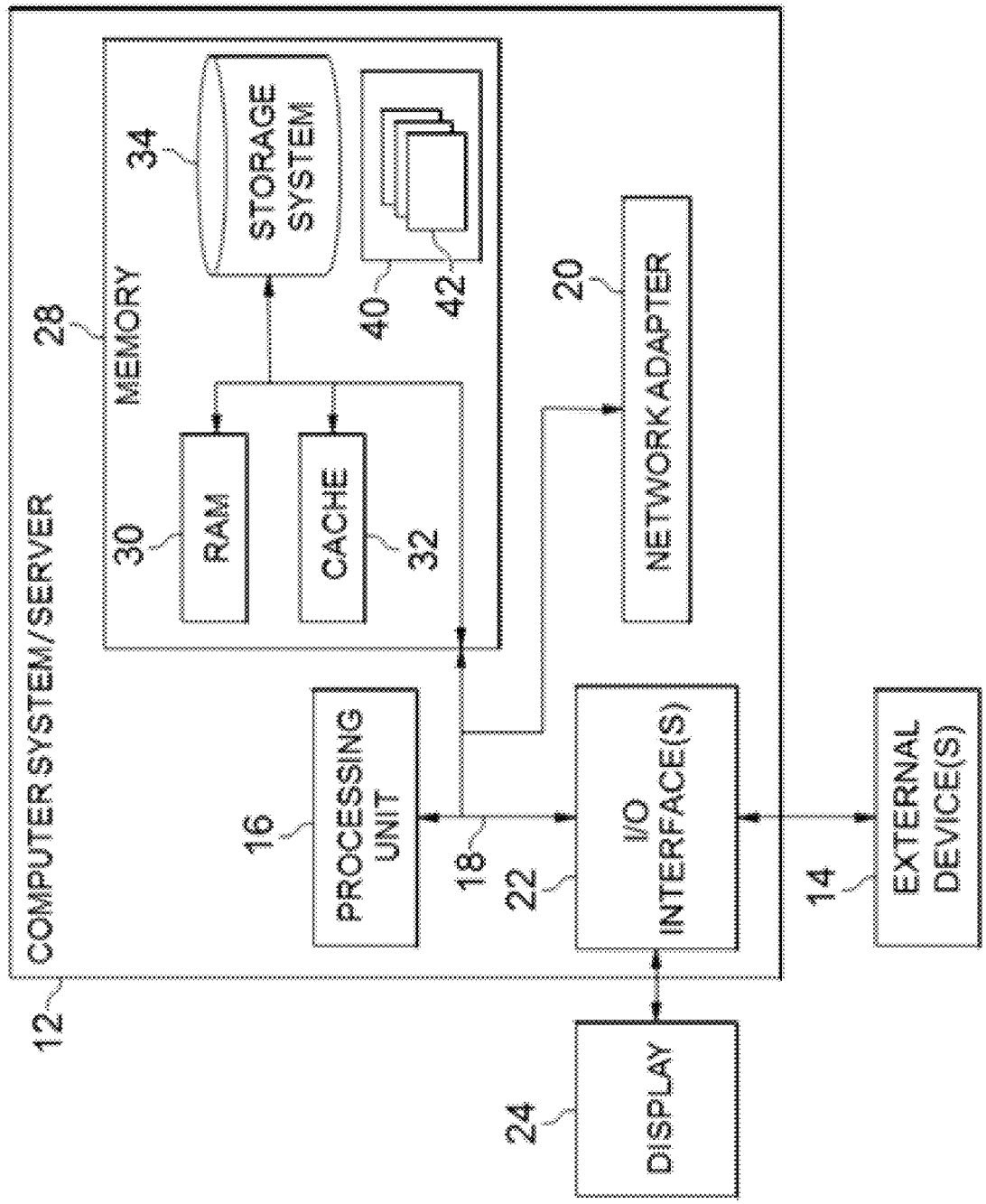
FIG. 1 illustrates a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
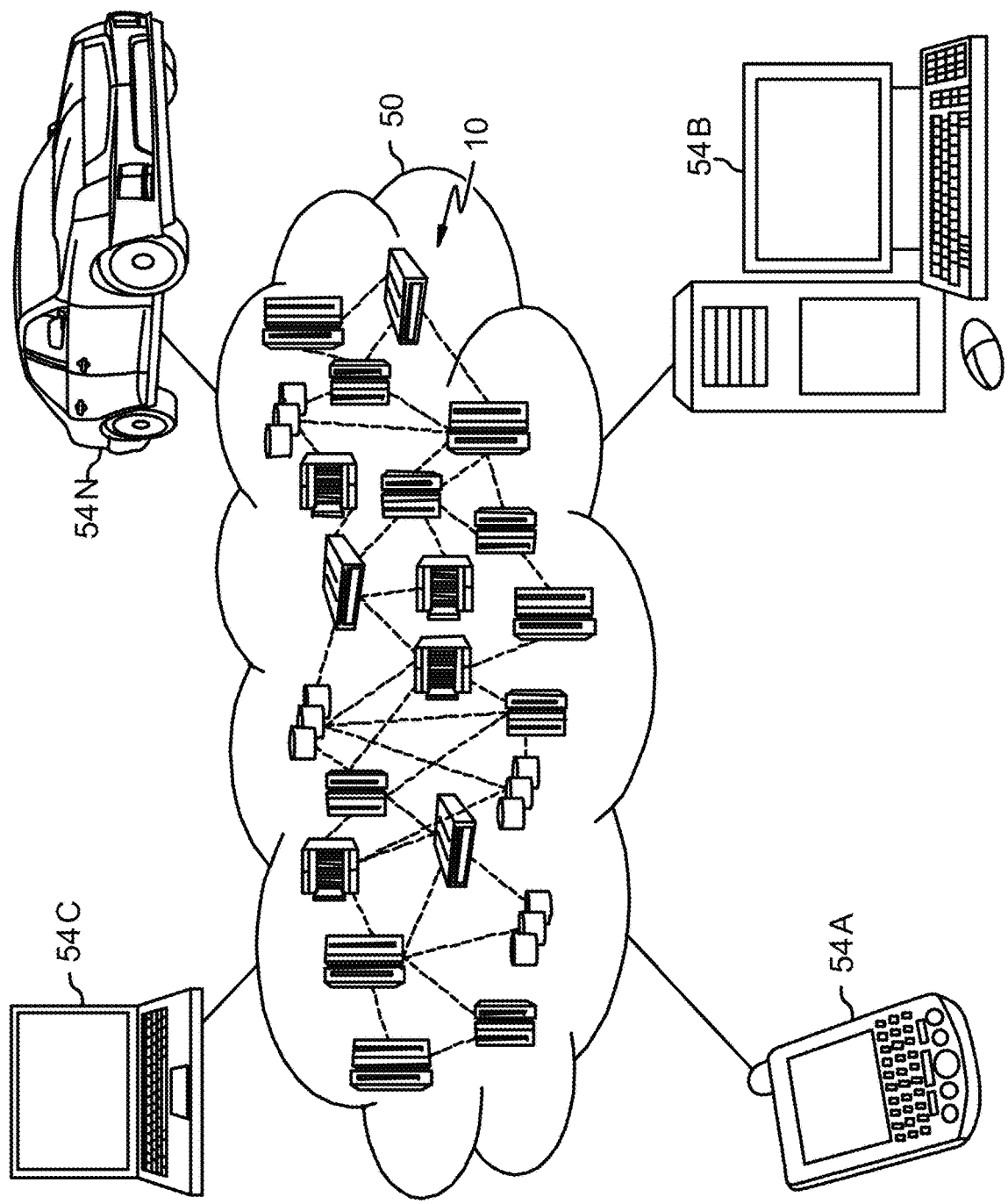
FIG. 2 illustrates a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
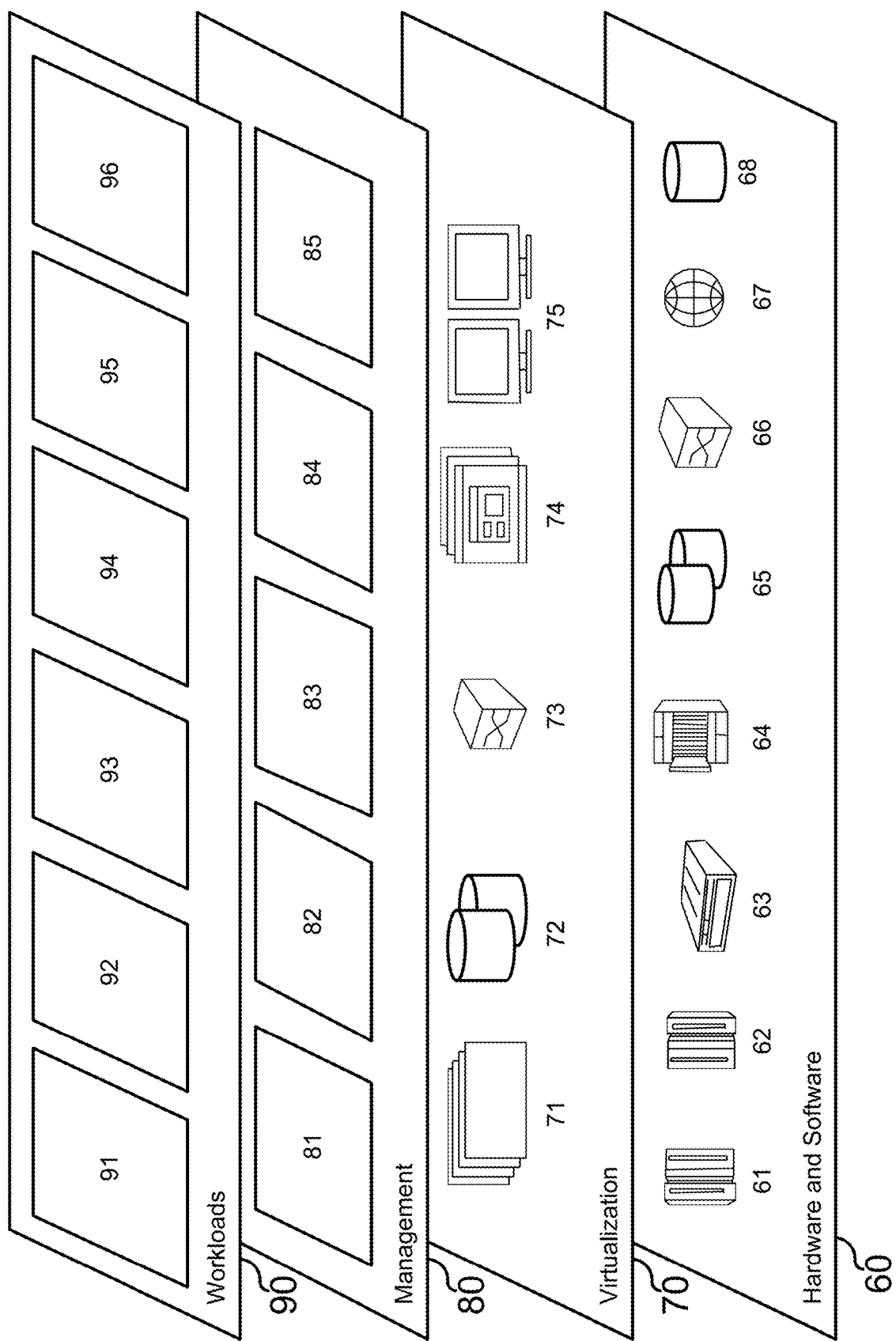
FIG. 3 illustrates abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and resource access authorization processing 96. The functionalities of resource access authorization will be described in the following embodiments of the present disclosure.

Embodiments of the present disclosure relate to authorization of resource access in a scenario of third-party authentication and authorization. For convenience of description, the embodiments of the present disclosure are discussed in the context of OAuth. It would be appreciated that the embodiments may be applicable to other third-party authentication and authorization architectures.

To define more clearly the terms used herein, the following exemplified definitions are provided, but the meaning of the terms should be interpreted broadly as known to the technical field to which the present disclosure relates.

The term "OAuth" refers to an open authorization, commonly used as a way for access delegation, to allow users to log into third-party applications using their network service accounts without exposing their passwords. In OAuth, the following roles are defined: "a resource owner," "a resource server," "a client," and "an authorization server." The definitions of each of the roles are defined below, which are applicable to embodiments of the present disclosure.

The term "a resource owner" may refer to an entity capable of granting access to a protected resource. When the resource owner is a person, the resource owner is referred to as an end-user. The term "a resource server" may refer to a server hosting the protected resources, capable of accepting and responding to protected resource requests using access tokens.

The term "a client" may refer to an application making protected resource requests on behalf of the resource owner and with its authorization. The term "client" does not imply any particular implementation characteristics (e.g., whether the application executes on a server, a desktop, or other devices). The client is working on the client device associated with the resource owner or on a remote system which is different from the client device. The client application may also be referred to as a third-party application. In the present disclosure, the terms "client," "client application," and "third-party application" are used interchangeably.

The term "an authorization server" may refer to a server issuing access tokens to the client after successfully authenticating the resource owner and obtaining authorization. The authorization server may be the same server as the resource server or a separate entity. The authorization server may include or be associated with different service/application providers to which an end-user might have registered and may sometime be referred to as an authorization provider.

The term "user agent" may refer to a client which initiates a request. These are often browsers, editors, spiders (web-traversing robots), or other end user tools.

Figure 4:
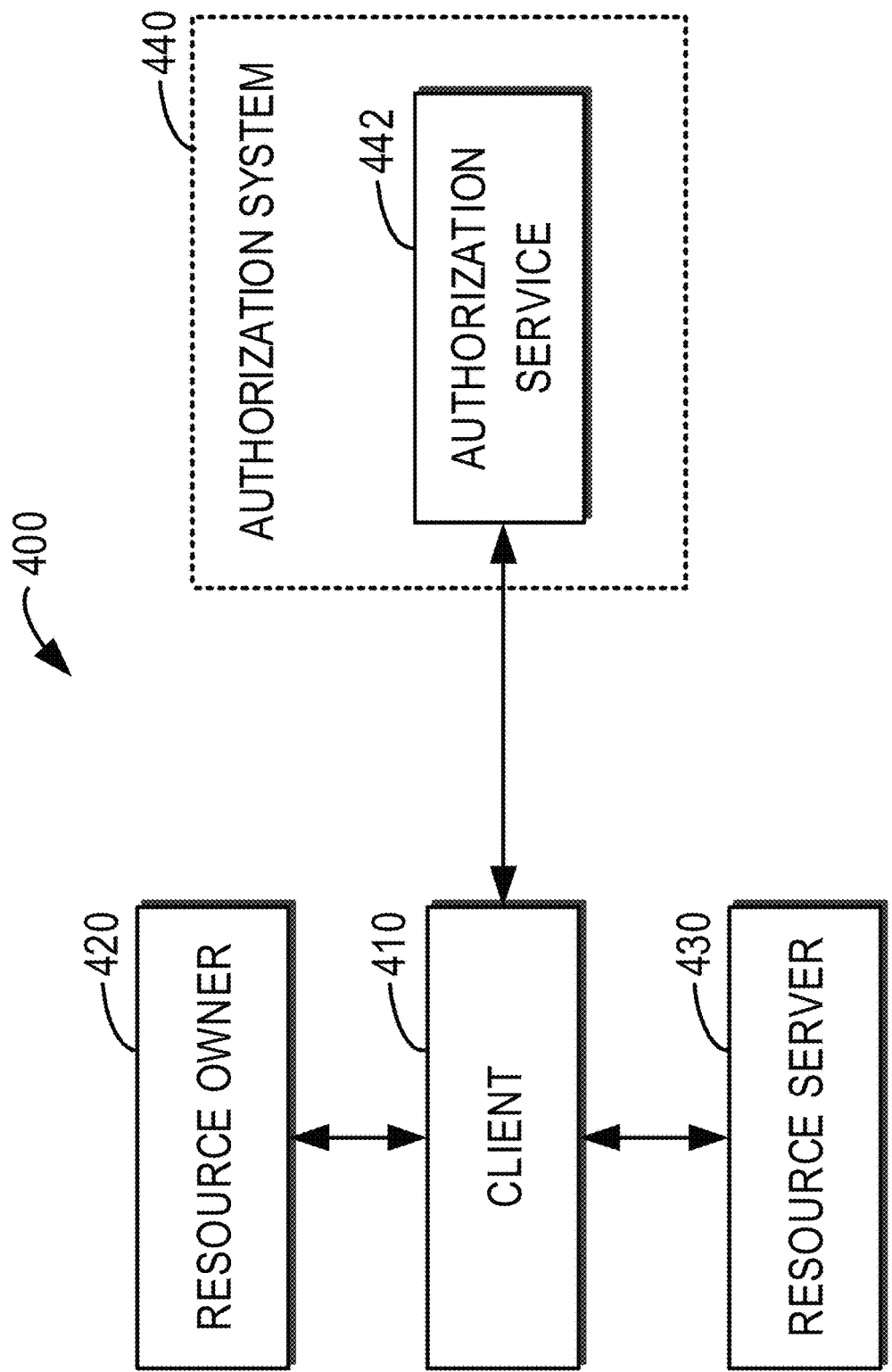
FIG. 4 illustrates a block diagram of a typical architecture for third-party authentication and authorization.

FIG. 4 illustrates a block diagram of a typical architecture 400 for third-party authentication and authorization. The architecture 400 is illustrated as an OAuth architecture, which involves a client 410, a resource owner 420, a resource server 430, and an authorization system 440 including an authorization service module 442 therein. The authorization system 440 may also be referred to as an authorization server. The client 410 may interact with the resource owner 420 and the authorization system 440 to obtain authorization to access the protected resources from the resource server 430.

A protected resource is either data related to a user's identity or a group of identities associated with a group of users, or a service associated with an identity of a user or group of identities associated with a group of users. The protected resource is generally generated when a user registers an account on a network service/application and may be stored on the server associated with the registered network service/application. Examples of protected resources include user profile information, private photos, contacts in an online address book, entries in an online calendar, lists of friends in an online social network, lists of bookmarks, lists of favorite songs stored in an online social network account, lists of goods recently purchased from an online store, the possibility to save or publish data on a server or blog, etc. A protected resource may include protected social information.

Figure 5:
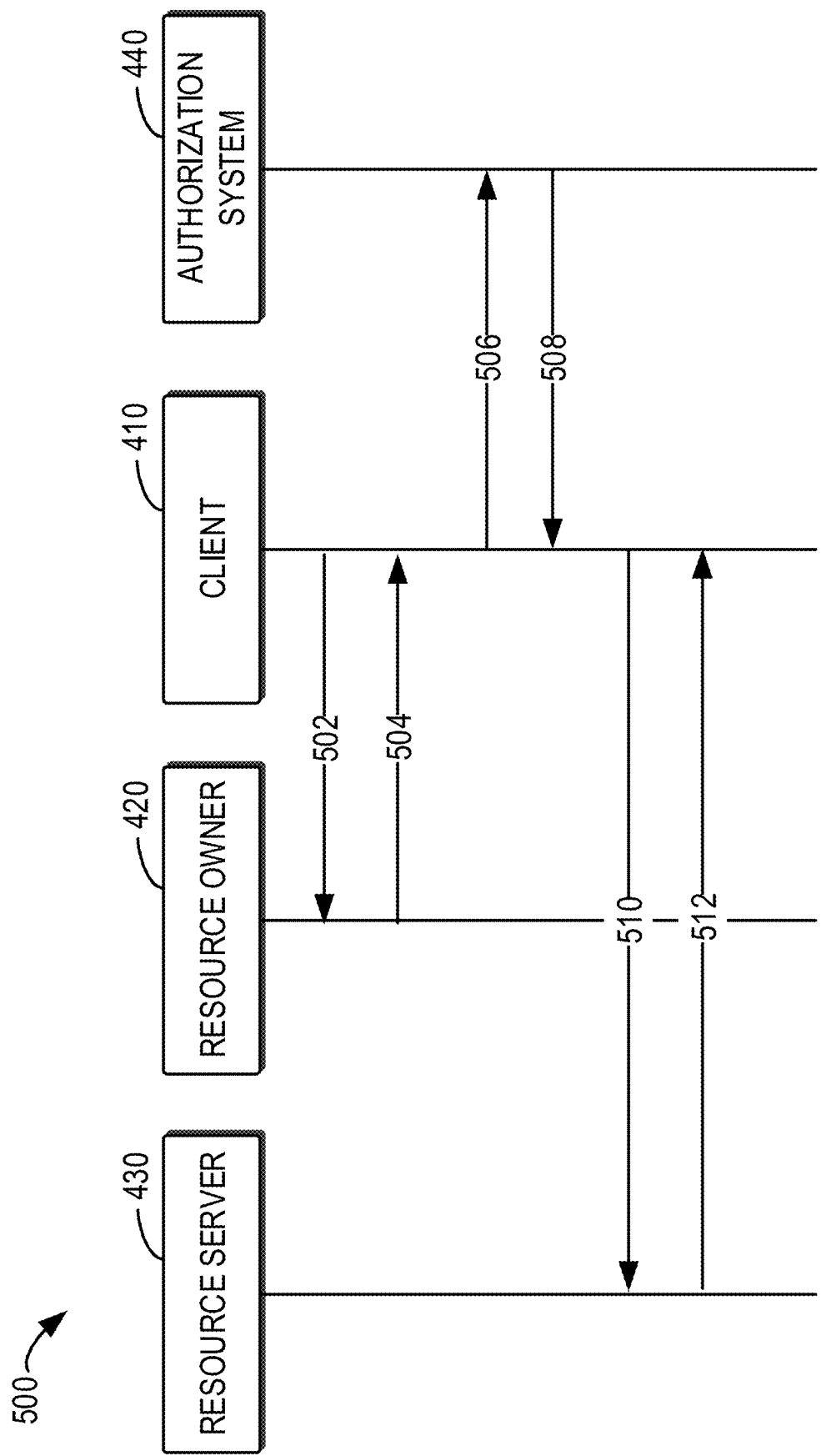
FIG. 5 illustrates a flowchart of a typical process for authorization of resource access.

FIG. 5 illustrates a flowchart of a typical authorization process 500 in the OAuth architecture 400. Specifically, the client 410 requests (502) authorization from the resource owner 420. The authorization request can be made directly to the resource owner 420 (as shown), or preferably indirectly via the authorization system 440 as an intermediary. The resource owner 420 decides to grant the authorization to the client 410. The client thus receives (504) an authorization grant, which is a credential representing the resource owner's authorization.

The client 410 requests (506) an access token by authenticating with the authorization system 440 and presenting the authorization grant. The authorization system 440 (for example, the authorization service module 412) authenticates the client and validates the authorization grant, and if valid, issues (508) an access token to the client 410. With the access token, the client 410 requests (510) the protected resource from the resource server 430 and authenticates by presenting the access token. The resource server 430 validates (512) the access token, and if valid, serves the request by, for example, providing the requested resource.

The OAuth mainly has the following four authorization grant types: an authorization code grant; an implicit grant, a resource owner password credentials grant, and client credentials grant. In different use application, the authorization grant type depends on the method used by the client 410 to request authorization and the types supported by the authorization system 440. Depending on the authorization grant type used, the detailed interactions among the entities in the OAuth architecture 400 and the authorization grant may be different. In some implementations, a user agent may be involved to direct the authorization request to the resource owner and request the access token for the client from the authorization service module.

After being granted with the access token, the client 410 has established an access session with the authorization system 440. In this access session, the client 410 may use the access token issued by the authorization system 440 to request specific protected resources of the resource owner 420 from the resource server 430 for a specific time period. The access session may be expired for a certain time period. The expiry of the access session may due to automatically or manually logging out from the authorization system 440, an expiry of a predefined time period (such as a lifetime of the access token set by the authorization system 440 or a period of inactivity time longer than a threshold for the client). When the access session has expired, for example, when the user logs out from the authorization system 440, the access token may be invalidated, and thus the client 410 can no longer use this access token to request a protected resource of the resource owner 420.

Currently, if the first authorization is invalid due to the expiry of the access session, the client has to initiate a second authorization process similar as the process 500. This is undesirable in many cases. As an example, in a specific use scenario of the third-party authentication and authorization, a client application (such as a hotel booking application) has been authorized by an authorization server (which is associated with a network social service (SNS) of an end-user) to access the protected resources of the end-user, such as the end-user's account information. If the access session between the hotel booking application and the authorization server is expired due to the user logging out the account from the hotel booking application, the hotel booking application cannot obtain any protected resources of the end-user. Thus, the next time the user accesses the hotel booking application, the hotel booking application cannot provide any hints to remind the user of the historical authorization. The hotel booking application may have to operate as the first time to get authorization from the same authorization server upon triggering from the user.

Preserving a certain resource of the resource owner to the client after the authentication has been expired may be beneficial. It may not only improve the user experience when using the third-party authentication and authorization service, but also enrich the services/contents to be provisioned by the client and/or the authorization server.

According to embodiments of the present disclosure, there is provided a solution of authorization of resource access. In the solution, after a first token has been assigned by an authorization system to authorize a client to access one or more protected resources of a resource owner, a separate second token is also assigned to the client. The first token depends on an access session between the authorization system and the client, while the separate second token is independent from the access session and associated with at least one or more protected resources of the resource owner. With this separate token, the client can request the associated protected resources from the authentication system even if the access session with the authorization system has been expired. In this way, the client can continue to obtain the protected resources of the resource owner after the authorization has been invalid.

Figure 6:
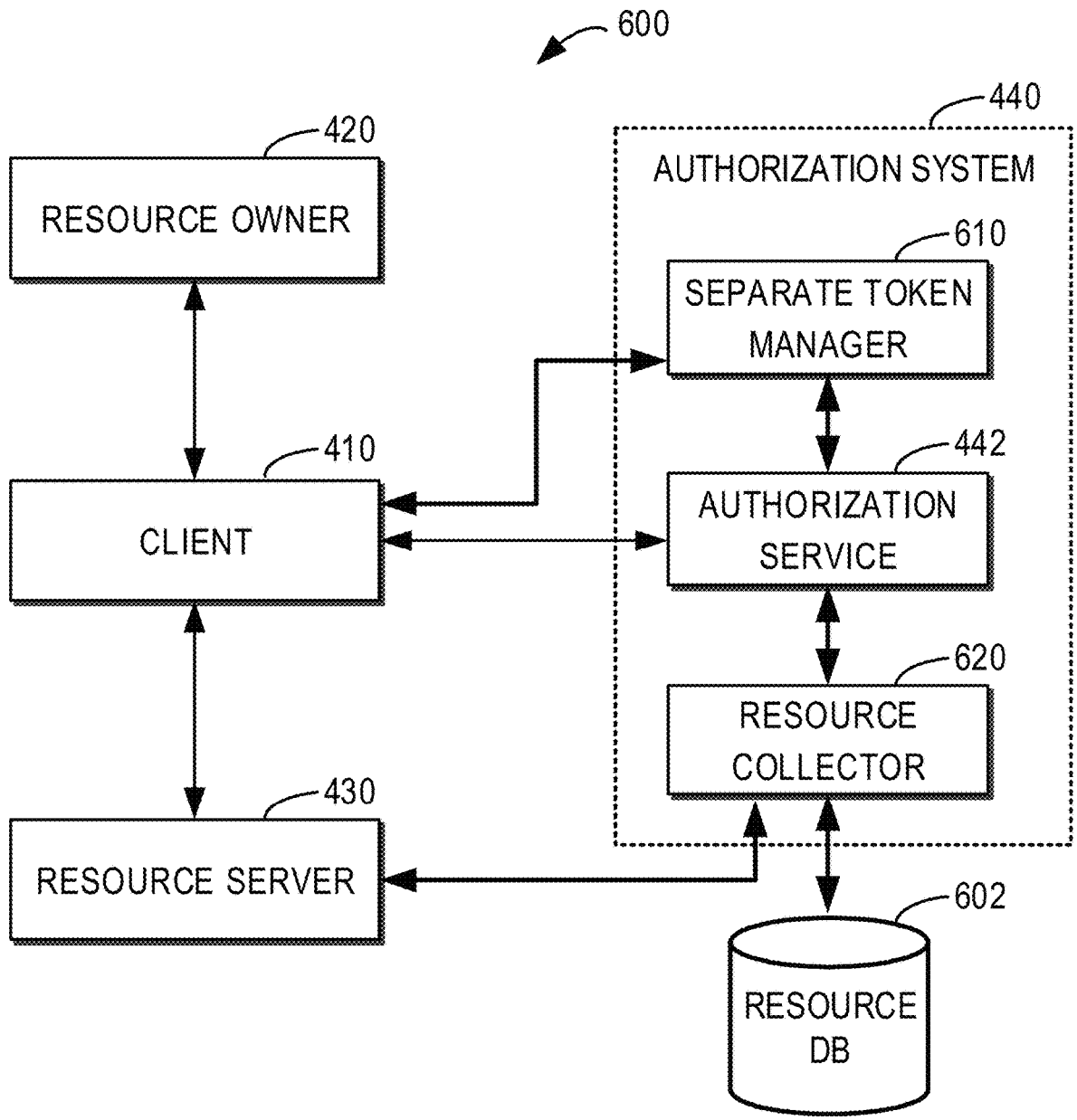
FIG. 6 illustrates a block diagram of an architecture for third-party authentication and authorization according to an embodiment of the present disclosure.

Example embodiments of the present disclosure will be described below. Referring now to FIG. 6, illustrated is an authorization architecture 600 that is extended from the traditional architecture 400 shown in FIG. 4 according to an embodiment of the present disclosure. In the architecture 600, the authorization system 440 includes a separate token manager module 610 in addition to the authorization service module 442 to implement the embodiments of the present disclosure.

The authorization service module 442 works as normal to assign an access token to authorize the client 410 to access one or more protected resources of the resource owner 420. The access token may be sometimes referred to as a first token hereinafter. The separate token manager module 610 is configured to generate and manage a separate token associated with one or more protected resources of the resource owner 420. This token is separated from the first token and may sometimes be referred to as a second token hereinafter.

The protected resource(s) that can be accessed using the first token may be a part or all of protected resources of the resource owner 420. The protected resource(s) that can be accessed using the second token may be a part or all of the protected resources that can be accessed using the first token. In addition, the protected resources(s) associated with the second token may be accessed for a longer time than the protected resources associated with the first token. In this regard, the one or more protected resources associated with the second token may sometimes be referred to as long-term protected resources.

In some implementations where the resource server 430 and the authorization system 440 are separated entities, the authorization system 440 further includes a resource collector module 620 to collect the long-term protected resource(s) from the resource server 430 and maintain the long-term protected resource(s) into a resource database 602.

Figure 7:
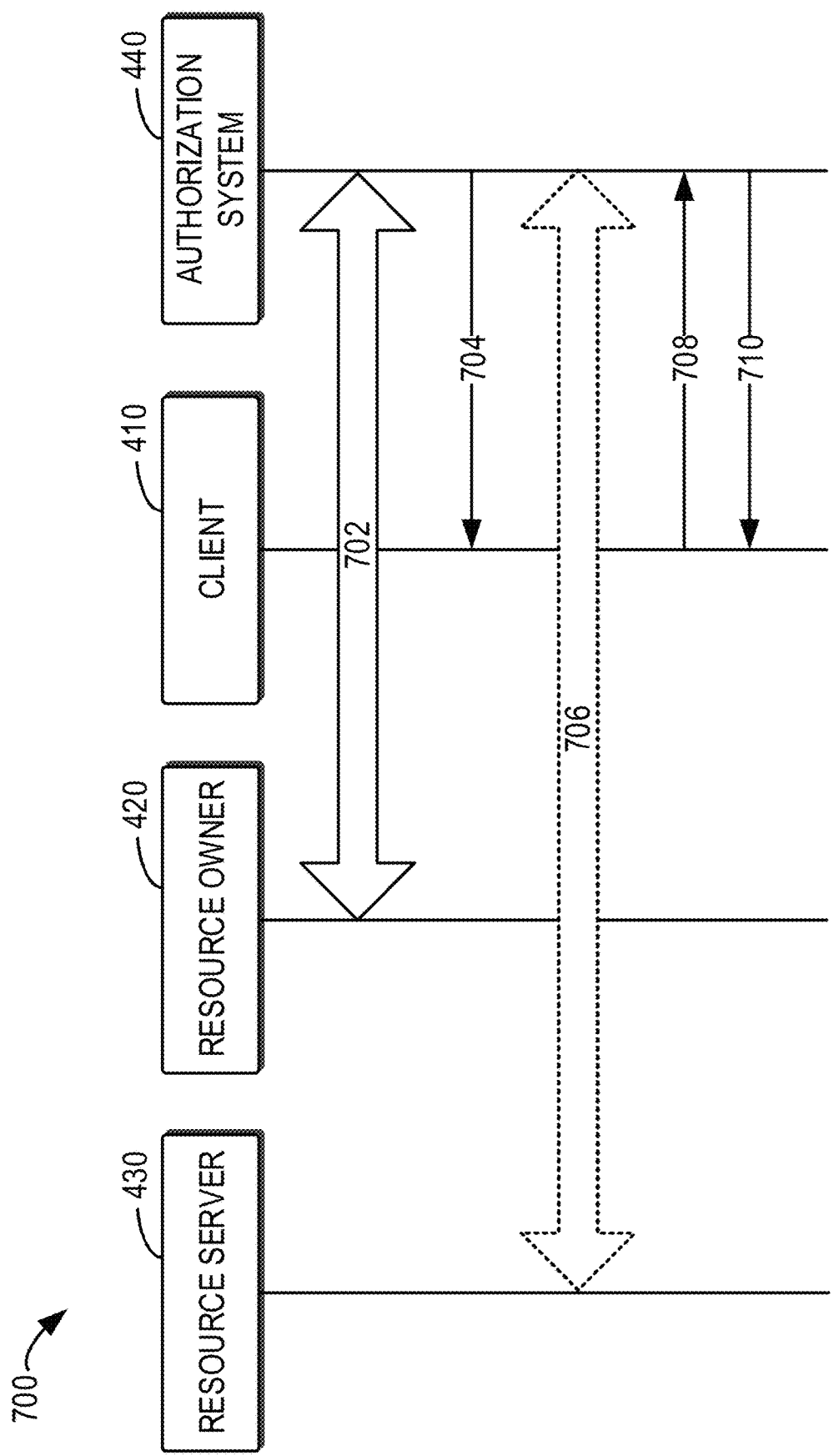
FIG. 7 illustrates a flowchart of a process for authorization of resource access according to an embodiment of the present disclosure.

The process of issuing and utilizing the second token will be described in detail with reference to FIG. 7, which illustrates a flowchart of a process of authorizing resource access 700 between the entities in the architecture 600.

The authorization system 440 (for example, the authorization service module 442) assigns a first token to authorize the client 410 to access one or more protected resources of the resource owner 420. The first token can be used to access a part or all of the protected resources owned by the resources owner 420. The assigning of the first token generally includes interactions (702) between the client 410, the resource owner 420, and the authorization system 440. In the implementations based on the OAuth protocol, the client 410, the resource owner 420, and the authorization system 440 may interact with each other in a manner as outlined in the process 500 of FIG. 5 so that the client 410 can be granted with the first token.

The detailed interactions for authorizing the client 410 by the authorization system 440 depends on the authorization method and the authorization grant types supported by the client 410 and the authorization system 440. Generally, the resource owner 420, such as an end-user, is the one who decides whether the authorization from the system 440 is permitted. The resource owner 420 may simply be provided with a prompt to accept or reject the authorization request from the client 410.

The first token is an access token issued by the authorization system 440 to the client 410 and depends on an access session between the authorization system 440 and the client 410. The term "depend on" here means that there is dependence between the first token and the access session, which at least defines that an expiry time or lifetime of the first token is related to an expiry time or lifetime of the access session.

Generally, upon granting the authorization to the client 410, an access session has been established between the authorization system 440 and the client 410. This access session may be expired for a certain time period. The expiry of the access session may due to automatically or manually logging out from the authorization system 440, an expiry of a predefined time period (such as a lifetime of the access token set by the authorization system 440 or a period of inactivity time longer than a threshold for the client 410). When the access session has expired, for example, when the user logs out from the authorization system 440, the first token may be invalid and expired. In this case, the client 410 cannot access any protected resources from the resource server 430 using this first token.

By assigning the first token, the client 410 has been authorized. According to embodiments of the present disclosure, based on the assigning of the first token to the client 410, the authorization system 440 assigns (704) a second token associated with one or more long-term protected resources of the resource owner 420. For example, after issuing the first token to the client 410, the authorization service module 442 indicates to the separate token manager 610 that the authorization of the client 410 is completed.

Then the separate token manager 610 may generate the second token and assign it to the client 410.

The second token is separated from the first token which is the normal standard access token assigned to the client 410. The second token may be used to authorize the client 410 to obtain the one or more long-term protected resources directly via the authorization system 440. In some embodiments, the second token may be different from the first token at least in that the second token is independent from the access session, which means that the second token can be used separately from the access session. As such, an expiry time or lifetime of the second token will not be affected by an expiry time or lifetime of the access session.

In addition, the second token may be further different from the first token in that an expiry time or lifetime of the second token may be set as longer than an expiry time or lifetime of the first token. Thus, the second token can be available for use even when the first token is expired. Alternatively, or in addition, since the second token is used to ensure a long term of accessing the one or more protected resources, the long-term protected resources associated with the second token may be a subset or a part of the protected resources to be accessed using the first token. For example, if the client 410 is allowed to use the first token to access both the profile information and the private photos of the resource owner 420, the second token may be generated as being associated with the profile information and thus can be used to obtain this information only in a later stage. In some examples, the protected resources to be accessed using the first or second token may be the same, which means that all the protected resources that can be accessed using the first token are long-term protected resources and can also be accessed using the second token.

In order to ensure the security of the user data, in some embodiments, the second token may be generated as being associated with one or more long-term protected resources having a relatively low sensitivity level. In an embodiment, the second token may be associated with some indicator resource/data which are mainly usage statistics and thus usually have relatively low sensitivity levels. Examples of the indicator resource may include, but are not limited to, a friend account in an application provided by a provider associated with the authorization system 440, the number of posts/articles/photos published on the application, a credit score of the resource owner 420 on the application, and the like.

In some embodiments, a user grant is needed to assign the second token to the client 410, which may further ensure the resource security. The authorization system 440 or the client 410 may provide the resource owner 420 a request to authorize one or more protected resources for a longer term than the expiry time of the access session. If the resource owner 420 confirms that the authorization system 440 can provide the protected resources to the client 410, the authorization system 440 may receive a user grant directly or via the client 410. In some examples, the resource owner 420 may select which part of its protected resources can be maintained for access after the expiry of the standard authorization process. The authorization system 440 may thus create the second token to be associated with the part of the protected resources that has been granted by the resource owner 420.

In some implementations where the authorization system 440 and the resource server 430 are separate entities, in response to the assigning of the first token or the second token, the authorization system 440 may optionally collect the one or more long-term protected resources associated with the second token from the resource server 430 which hosts protected resources for the resource owner 420.

The collection of the one or more long-term protected resources may include interactions (706) at least between the authorization system 440 and the resource server 430. Specifically, the authorization system 440 may request the resource server 430 for the one or more long-term protected resources and obtain the long-term protected resources returned from the resource server 430. In some embodiments, the one or more long-term protected resources obtained from the resource server 430 may be stored into a resource database 602. In some embodiments, the resource collector module 620 is configured to collect the one or more long-term protected resources in response to an indication of the assigning of the first token or the second token from the authorization service 442 or the separate token manager 610.

The one or more stored long-term protected resources at the database 602 may be synchronized with the corresponding latest protected resources of the resource owner 420 hosted at the resource server 430. Upon receiving a trigger to update the one or more long-term protected resources, the authorization system 440 may request the resource server 430 for the corresponding updated protected resources. The trigger may be configured as various types. As an example, the trigger may include a trigger related to time periodicity or a manual trigger. The authorization system 440 may obtain the one or more updated long-term protected resources returned from the resource server 430 and store the update long-term protected resources into the resource database 602 to, for example, replace the previous version of the long-term protected resources.

In some implementations, the authorization system 440 may be the same entity as the resource server 430. In this case, the interactions for collecting the one or more long-term protected resources may be omitted from the process 700 and the resource collector module 620 may be omitted from the authorization system 440.

The client 410 obtains the second token from the authorization system 440 and may store the second token. In an active access session after the authorization, the client 410 may use the first token to access the corresponding protected resources from the resource server 430. The client 410, if desiring to obtain one or more long-term protected resources of the resource owner 420, initiates (708) a request including the second token to the authorization system 440. The request aims to obtain the associated one or more long-term protected resources for use. Since the second token is a credential specific to the one or more long-term protected resources, the client 410 is granted to obtain these protected resources by presenting the second token.

In some embodiments, the client 410 may initiate the request including the second token to the authorization system 440 upon determining that the access session between the client 410 and the authorization system 440 has expired. If the access session is still active, the client 410 may request the long-term protected resources as well as other protected resources using the first token, for example, by sending a request including the first token to the resource server 430.

Upon receipt of the request from the client 410, the authorization system 440 validates the second token included in the request and if valid, provides (710) the associated one or more long-term protected resources to the client 410. In this way, even if the access session has expired, the client can still obtain some protected resources of the resource owner 420 using the separate second token created when the user was authorized previously.

In some embodiments, the separate second token, which is independent from the access session between the client 410 and the authorization system 440, may be shared with different clients and/or even different devices. The authorization system 440, upon receipt of a request from a further client other than the client 410, may detect whether the request includes the second token and may provide the one or more long-term protected resources to the further client if the second token is detected.

In an embodiment, the client 410 is allowed to actively share the second token with one or more further clients. Alternatively, or in addition, the authorization system 440 may provide, either actively or in response to a request, the second token to one or more further clients that are associated with the client 410. For example, the second token may be shared with one or more further clients that are installed on the same user device as the client 410. The second token may also be shared among the clients on different devices that are associated with the same user. As such, it is possible to allow the one or more long-term protected resources to be accessed by the clients/devices that have never been authorized directly by the authorization system 440.

In some embodiments, before sharing the second token among clients and/or devices, a user grant from the resource owner 420 may be needed to ensure the resource security. The authorization system 440 may provide the resource owner 420 a request to share the one or more long-term protected resources with one or more specific clients or devices. If the resource owner 420 confirms that the one or more long-term protected resources can be provided to other clients or devices using the second token, the authorization system 440 may receive a user grant directly or via the client 410. In some examples, the resource owner 420 may select which clients/devices may be shared using the second token.

If the authorization system 440 determines that a further client has been granted by the resource owner to access the one or more long-term protected resources, it may share the second token with the further client directly or via the client 410. Upon receipt of the second token, the further client may also be able to obtain the one or more long-term protected resources associated with the second token.

In some embodiments, the resource owner 420 may revoke the one or more long-term protected resources from being accessed using the second token. The authorization system 440 may receive a request from the resource owner 420 to revoke the one or more long-term protected resources and in response to this request, the authorization system 440 may release the second token, which means that the second token is invalidated at the authorization system 440 and/or the client 410 and may be deleted from the authorization system 440 and/or the client 410 in some examples. With the second token released, the one or more long-term protected resources will not be accessed by any client using the second token.

In some examples, the resource owner 420 may request to revoke the long-term protected resource(s) from one or more specific clients but not all the clients. In some embodiments, in the case that the second token is released, the authorization system 440 may prevent the one or more long-term protected resources from being provided to the client even if a request including the second token is received from that client. The authorization system 440 (for example, the separate token manager 610 included therein) may maintain a look-up table recording to which one or more client(s) the second token is assigned. The clients as listed in the table may include the client 410 and possibly one or more other clients that obtain the second token shared by the client 410.

Upon receiving the request to revoke the long-term protected resource(s) from a specific client, the authorization system 440 may update the look-up table to invalidate the association between the second token and that specific client. In this way, the one or more long-term protected resources cannot be accessed by a specific client but may still be accessed by other clients. As a result, even if receiving a request including the second token from that specific client, the authorization system 440 will not provide the long-term protected resource(s) because the second token is not valid to that client anymore, according to the updated look-up table.

Upon determining to release the second token from a client, the authorization system 440 may issue a notification to the client to indicate that the second token is released and/or to instruct the client to delete the second token. In the embodiment of maintaining the look-up table as described above, if the second token is released from one or some of the clients as listed in the table, the corresponding indications of the clients may be deleted from the table. If second token is released from all of the clients, the whole table may be deleted. In some embodiments, for security concern, in response to release the second token from all of the one or more clients, the authorization system 440 may delete the one or more long-term protected resources stored in the resource database 602.

In some further embodiments, with the one or more long-term protected resources, the client 410 may perform some specific processes and/or actions before establishing an access session with the authorization system 440. In some embodiments, the client 410 may generate one or more resources specific to the client 410 (also referred to as client-specific resources) based on the one or more long-term protected resources. The client-specific resource(s) and/or the one or more long-term protected resources of the resource owner 420 may be presented. For example, the client-specific resources and/or the long-term protected resource may be displayed in an appropriate form for a user of the client 410. In some embodiments, the client 410 may process its own data (resources) aimed to be presented to the user based on the one or more long-term protected resources of the resource owner 420. The one or more long-term protected resources may help to remind the user of the historical authorization and the one or more client-specific resources may help the client 410 and/or the authorization provider to promote/recommend its services/features and attract more users.

In some embodiments, the client 410 may analyze the one or more long-term protected resources locally or cause a separate external device or module (which may be referred to as an analytic broker) to perform part or all of the resource analysis task and generate the one or more client-specific resource. The client-specific resource(s) and the long-term protected resource(s) may be stored first and presented to the user upon being requested.

In some embodiments, the client 410 and/or the external analytic broker may use various data analysis tools/technologies, such as big data analytics, smart recommendation, and the like. The data analysis tools/technologies depend on the data processing capability of the client 410 and/or the separate analytic broker, and depend on the actual requirements on data presentation on the client 410. The scope of the present embodiments is not limited in this regard.

Figure 8A:
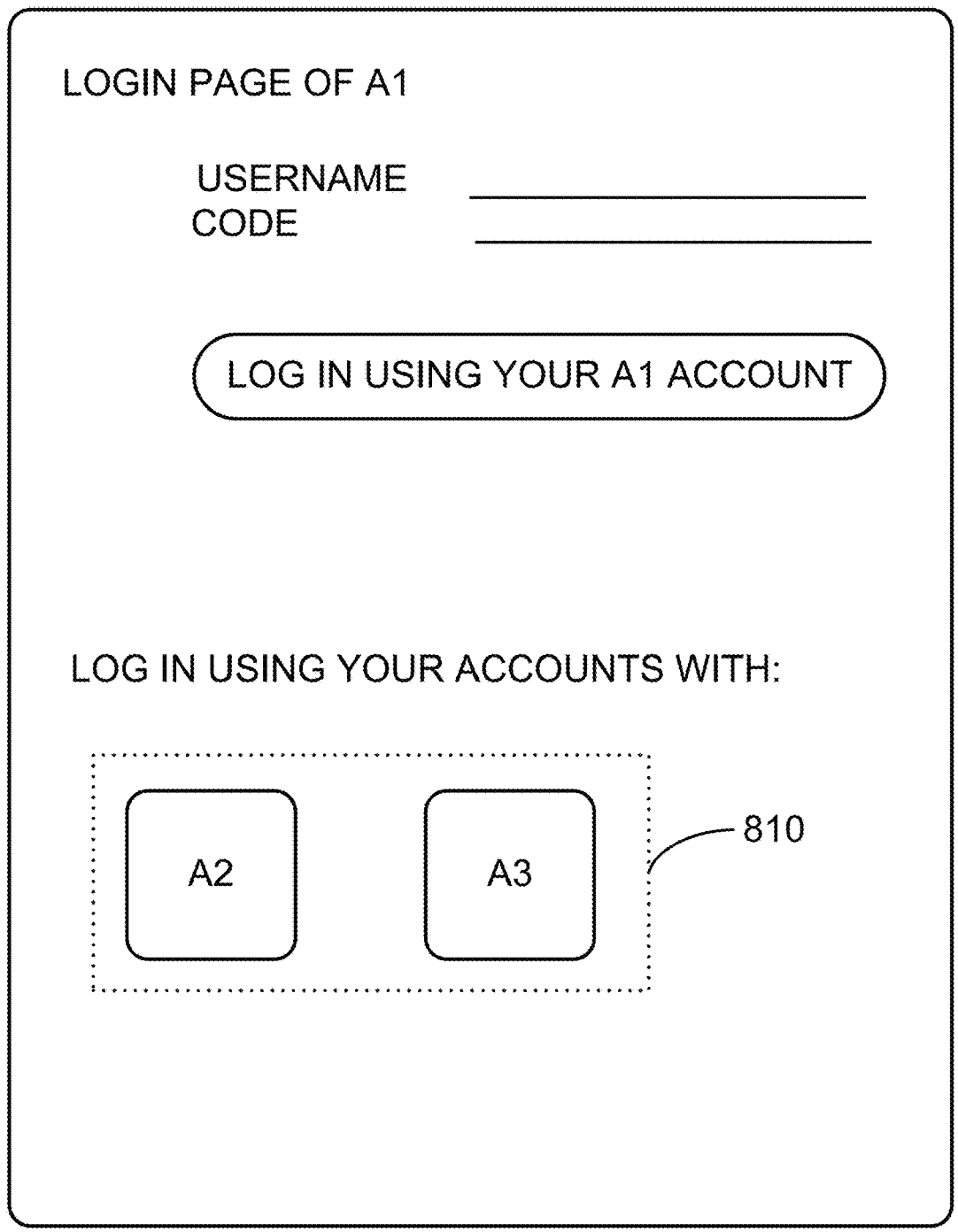
FIGS. 8A-8C illustrate example user interfaces for authorization of resource access according to embodiments of the present disclosure.

For convenience of understanding, some examples of user interfaces (UIs) are provided to clearly and intuitively show the authorization of resource access described in the present disclosure. FIG. 8A shows an UI 801 showing a login page of a client application (represented as "A1"). In the login page, in addition to provide inboxes for the user to log in the client application A1 using the account name and code registered with this application, some other login options are provided in an area 810, to allow the user to log in using registered accounts of some other client applications (represented as "A2" and "A3"). At this time, the client application A1 has not authorized by any authorization servers associated with the client applications A2 to A3 yet. Thus, no particular resource/data indicates which accounts the user has ever registered with the client applications A2 to A3.

Figure 8B:
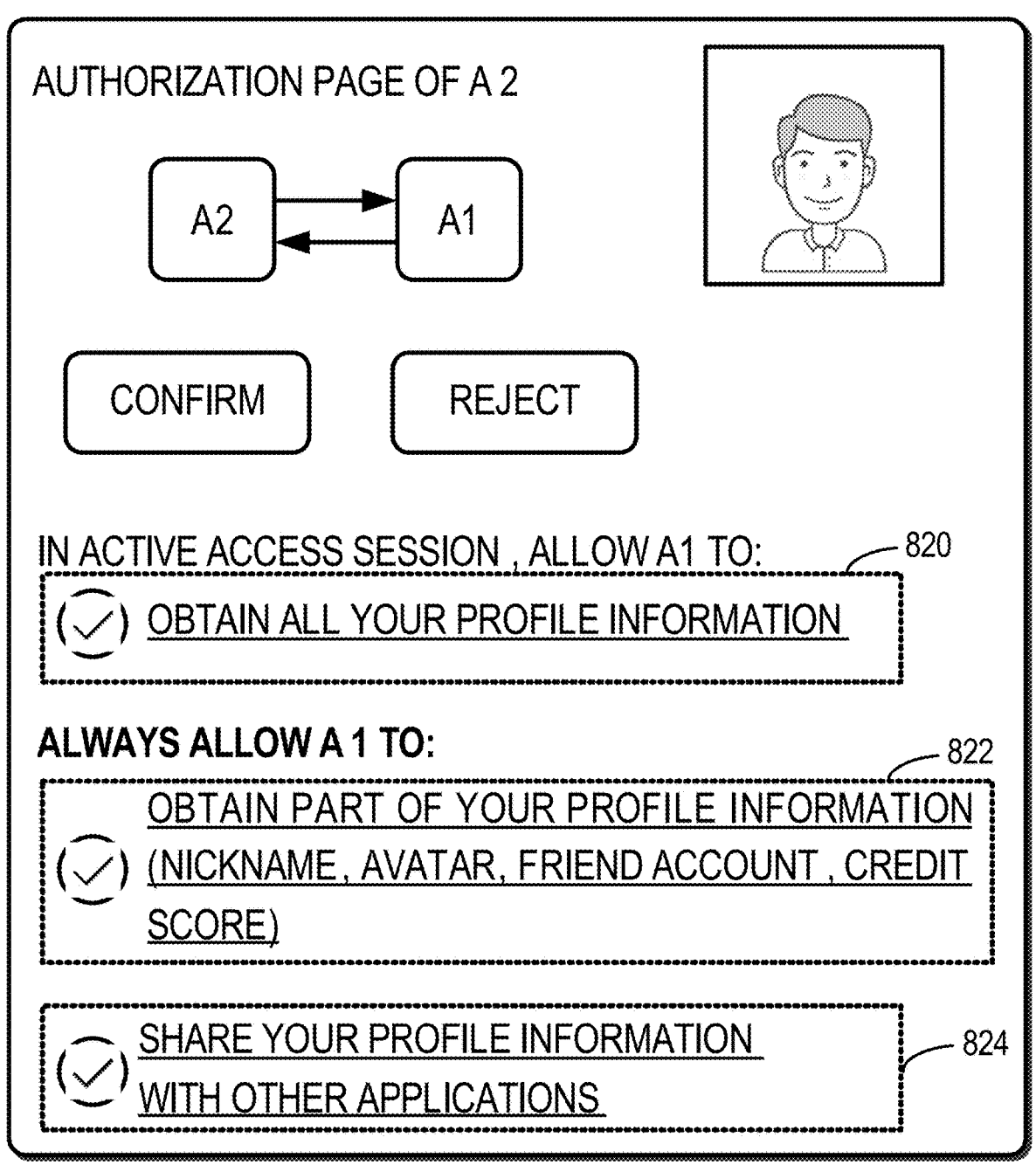

If the user selects the application A2, the client application A1 may requests the resource owner who owns the protected resources of the application A2 to grant authorization. The user may be directed to an UI 802 in FIG. 8B, which presents an authorization page of the application A2. The user (i.e., the resource owner) may confirm or reject to grant authorization of the application A1. To ensure the resource security, more information is presented in areas 820, 822, and 824 to allow the user to specify the authorization scope. In the area 820, the user is presented with an option to decide whether to allow the client application A1 to obtain all the protected resources of the user in an active access session. By selecting this option, the user grants the client application A1 to obtain his/her protected resources using the first token that depends on the access session as described herein.

In the area 822, the user is presented with an option to decide whether to allow the client application A1 to obtain the user's resources on the application A2, such as the nickname, the avatar, the friend account, the credit score, and the like. In the area 824, the user is presented with an option to allow the client application A1 to share the user's resources on the application A2 to other application. The user can select one or more of the options to grant the client application A1 to obtain his/her protected resources using the second token that is independent from the access session as described herein. The prompt information "always allow A1 to:" in the UI 802 notifies the user that the access period of the listed resources will be relatively long.

According to some embodiments of the present disclosure, if the user confirms the authorization, the client application A1 may be authorized to access the resources of the user on the application A2 with a first token. In addition, the authorization server associated with the application A2 may assign a second token to the client application A1, which is associated with at least a part of the protected resources on the application A2, such as the user nickname, the user avatar, and the friend account. It is supposed that in some other instances, the user chooses to log in the application A1 using a different registered account of the application A2 and using another registered account of the application A3 at different times of logging in. Then the client application A1 may obtain, from the authorization server associated with the application A1, a different second token associated with a different set of protected resources on the application A2 (due to the different account used to log in this application). The client application A1 may also obtain a further second token associated with a different set of protected resources on the application A3.

Figure 8C:
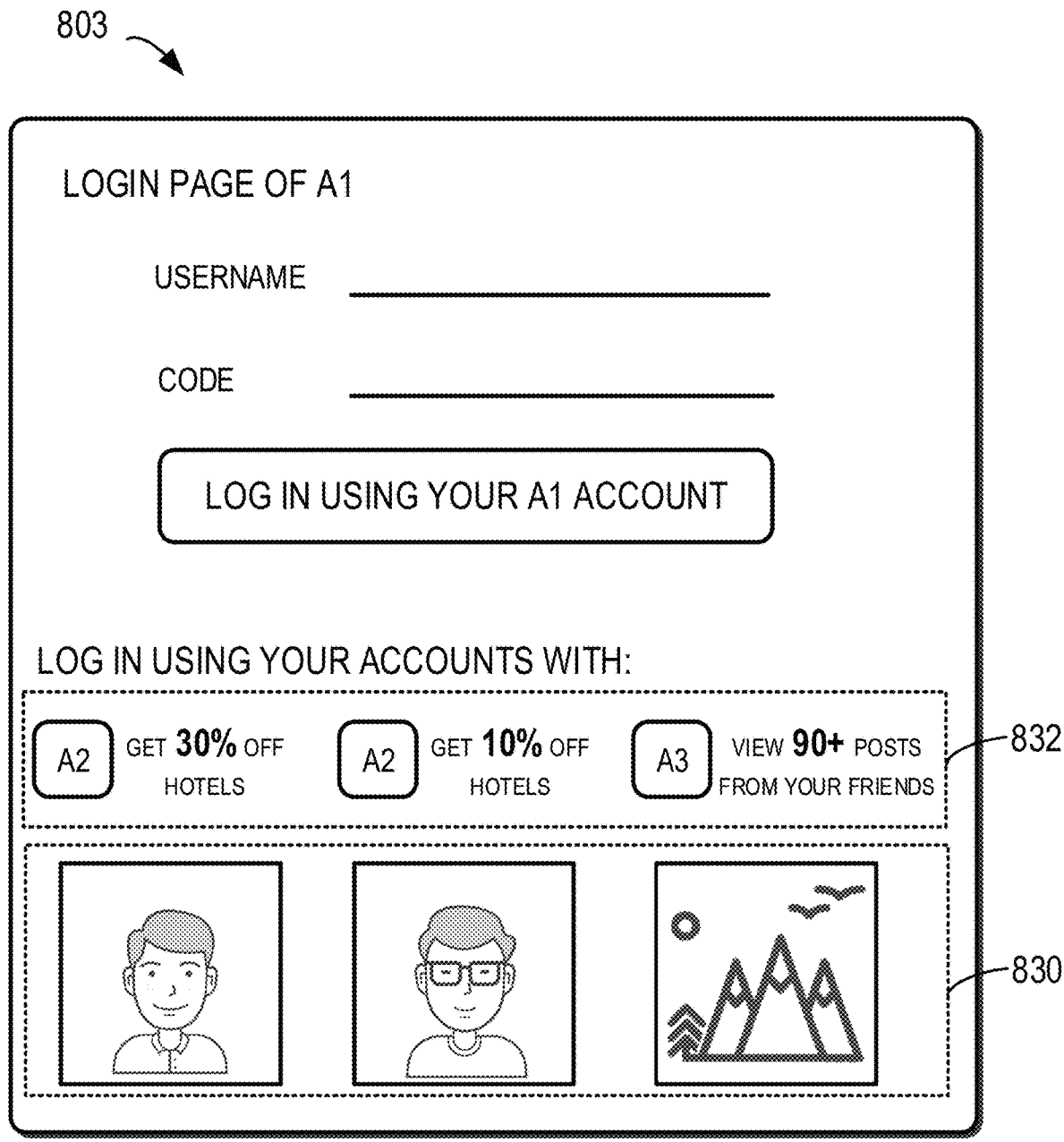

The next time the user launches the client application A1, this application may request the corresponding authorization servers for the applications A2 to A3 for the protected resources using the respective second tokens. The client application A1 may obtain the protected resources from the authorization servers and present part or all of the resources on its UI. An UI 803 of FIG. 8C shows the log in page of the application A1, where the avatars of the applications A2 and A3 are presented in an area 830, including the avatars of two different accounts of the application A2.

In addition, the client application A1 may further analyze the obtained general protected resources to generate resources specific to the client application A1. For example, by analyzing the credit scores of two accounts of the application A2 and by applying other analytic rules, the client application A1 decides to provide different percentages of hotel discounts for the two accounts and presents the corresponding contents in an area 832. Further, by analyzing the friend list of the account of the application A3 and by applying other analytic rules, the client application A1 decides to promote in the area 832 the posts published on the application A1 by the friends of that account in order to attract the user. In this way, it is possible to not only remind the user of which accounts have been chosen to log in the application A1 by showing the avatars, but also can use promotion contents to help the user decide the preferred authorization servers (which are associated with the corresponding applications to be chosen).

Figure 9:
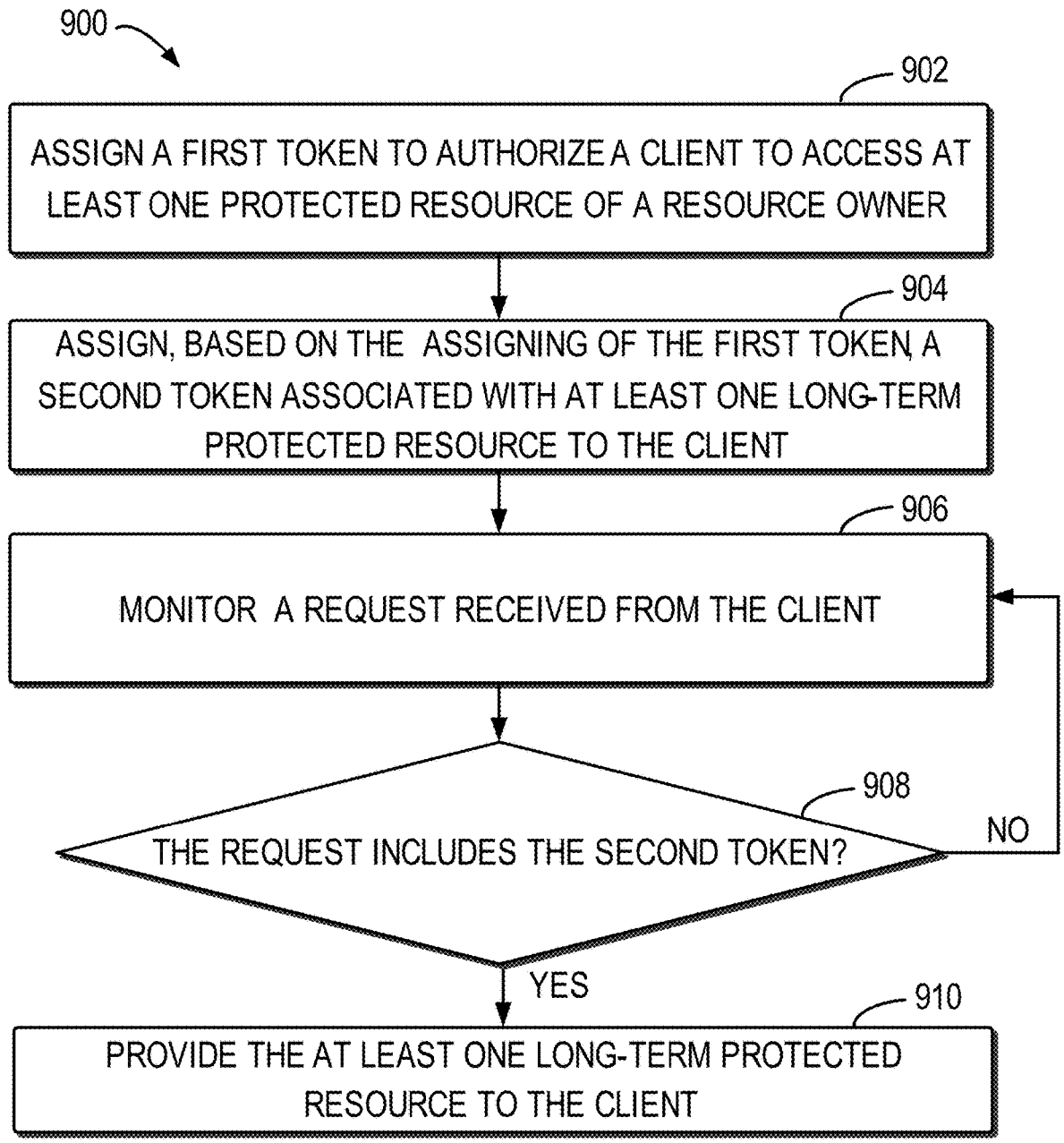
FIG. 9 illustrates a flowchart of a method implemented at an authorization system according to an embodiment of the present disclosure.

FIG. 9 shows a flowchart of an example method 900 in accordance with some embodiments of the present disclosure. The method 900 can be implemented at the authorization system 440 as shown in FIG. 5. For the purpose of discussion, the method 900 will be described from the perspective of the authorization system 440 with reference to FIG. 5.

At block 902, the authorization system 440 assigns a client 410 to authorize a client to access at least one protected resource of a resource owner. The first token depends on an access session between an authorization system and the client. At block 904, the authorization system 440 assigns, based on the assigning of the first token, a second token associated with at least one long-term protected resource of the resource owner to the client. The second token is independent from the access session. At block 906, the authorization system 440 monitors a request received from the client 410. At block 908, the authorization system 440 determines whether the request received from the client 410 includes the second token. At block 910, in response to receiving the request including the second token from the client 410, the authorization system 440 provides the at least one long-term protected resource to the client. If the request including the second token is not detected, the authorization system 440 continues the monitoring at block 906.

In some embodiments, the at least one long-term protected resource may be a part of the at least one long-term protected resource.

In some embodiments, the authorization system 440 may determine whether a further client has been granted by the resource owner to access the at least one long-term protected resource and may share the second token with the further client in response to determining that the further client has been granted.

In some embodiments, in response to receiving from the further client a further request including the second token, the authorization system 440 may provide the at least one long-term protected resource to the further client.

In some embodiments, the authorization system 440 may receive a request from the resource owner to revoke the protected resource and release the associated second token from the client.

In some embodiments, the protected resource may be hosted by a device separated from the authorization system. In some embodiments, the authorization system 440 may request the device for the at least one long-term protected resource in response to the assigning of the first token or the second token, obtain the at least one long-term protected resource from the device, and store the at least one obtained long-term protected resource.

In some embodiments, in response to a trigger to update the at least one long-term protected resource, the authorization system 440 may request the device for the at least one updated long-term protected resource, obtain the at least one updated long-term protected resource from the device, and store the at least one updated long-term protected resource.

In some embodiments, a lifetime of the second token may be set to be longer than a lifetime of the first token.

Figure 10:
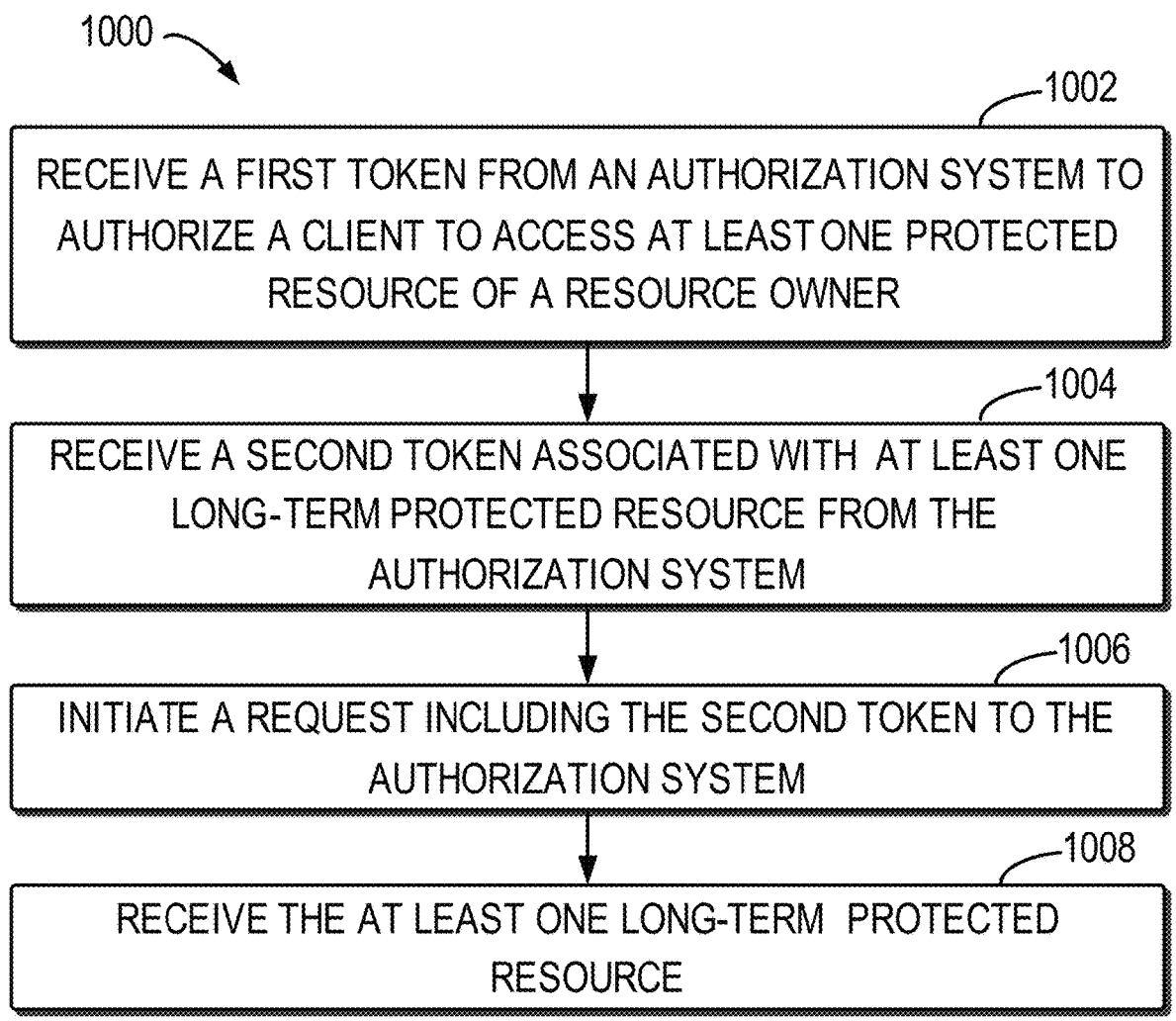
FIG. 10 illustrates a flowchart of a method implemented at a client according to an embodiment of the present disclosure.

FIG. 10 shows a flowchart of an example method 1000 in accordance with some embodiments of the present disclosure. The method 1000 can be implemented at the client 410 as shown in FIG. 5. For the purpose of discussion, the method 1000 will be described from the perspective of the client 410 with reference to FIG. 5.

At block 1002, the client 410 receives a first token from an authorization system to authorize the client 410 to access at least one protected resource of a resource owner. The first token depends on an access session between the authorization system and the client. At block 1004, the client 410 receives a second token associated with at least one long-term protected resource from the authorization system. The second token is independent from the access session. At block 1006, the client 410 initiates a request including the second token to the authorization system. At block 1008, the client 410 receives the at least one long-term protected resource.

In some embodiments, the at least one long-term protected resource may be a part of the at least one long-term protected resource.

In some embodiments, the client 410 may generate a client-specific resource based on the at least one long-term protected resource and present at least one of the at least one long-term protected resource and the generated client-specific resource.

In some embodiments, a lifetime of the second token may be set to be longer than a lifetime of the first token.

It should be noted that the processing of resource access authorization according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
assigning, by one or more processing units of an authorization system during an access session, a first token and a second token to a first client to authorize the first client to access end user account information stored at a resource owner, wherein:
the end user account information comprises higher sensitivity account information and lower sensitivity account information;
the end user account information is hosted by a device separated from the authorization system;
the first token depends on the access session between the authorization system and the first client, and wherein a scope of authorization of the first token is determined by receiving a set of authorization options from the resource owner, the set of authorization options represented graphically within a user interface and selectable by a user;
the second token associated with lower sensitivity account information, wherein the second token is independent from the access session, and wherein the second token is stored, according to the first client, in a table of the authorization system;
a lifetime of the second token is set to be longer than a lifetime of the first token; and
the first token is prioritized over the second token until the access session is terminated;
in response to the assigning of the first token and the second token:
obtaining, by a resource collector module of the authorization system, the lower sensitivity account information;
storing, in a resource database of the authorization system, the lower sensitivity account information; and
in response to receiving a request from the first client after the session has expired, the request including the second token, and in response to validating the first client against the table, transmitting, from the resource database of the authorization system, the stored lower sensitivity account information to the first client.

2. The method of claim 1, further comprising:
determining, by the one or more processing units, whether a further client has been granted by the resource owner to access the lower sensitivity account information;
in response to determining that the further client has been granted, sharing, by the one or more processing units of the first client, the second token with the further client; and
storing the second token, according to the further client, in the table of the authorization system, wherein the second token authorizes access to the lower sensitivity account information.

3. The method of claim 2, further comprising:
in response to receiving from the further client a further request including the second token and validating the further client against the table, providing, by the one or more processing units, the lower sensitivity account information to the further client.

4. The method of claim 2, further comprising:
receiving, by the one or more processing units, a request from the resource owner to revoke access to the lower sensitivity account information by the further client;
updating the table of the authorization system to reflect the revoked access for the further client without invalidating the second token;
receiving, from the further client, an access request for the lower sensitivity account information; and
in response to querying the table and determining the further client is not authorized, denying access to the lower sensitivity account information.

5. The method of claim 1, further comprising:
in response to a trigger to update the at least some of the end user account information, requesting, by the one or more processing units, the updated lower sensitivity account information from the device;
obtaining, by the one or more processing units, the updated lower sensitivity account information from the device; and
storing, by the one or more processing units, the updated lower sensitivity account information in the resource database.

6. A system comprising:
a processing unit; and
a memory coupled to the processing unit and storing instructions thereon, the instructions, when executed by the processing unit, performing acts including:
  receiving, during an access session, a first token and a second token from an authorization system to authorize a first client to access end user account information stored at a resource owner, wherein:
    the end user account information comprises higher sensitivity account information and lower sensitivity account information;
    the end user account information is hosted by a device separated from the authorization system;
    the first token depends on the access session between the authorization system and the first client, and wherein a scope of authorization of the first token is determined by receiving a set of authorization options from the resource owner, the set of authorization options represented graphically within a user interface and selectable by a user;
    the second token is associated with the lower sensitivity account information from the authorization system, wherein the second token is independent from the access session, and wherein the second token is stored, according to the first client, in a table of the authorization system;
    a lifetime of the second token is set to be longer than a lifetime of the first token: and
    the first token is prioritized over the second token until the access session is terminated:
  initiating a request from the first client, the request including the second token, to the authorization system after the access session has expired; and
  in response to the authorization system validating the first client against the table, receiving, by the first client, the lower sensitivity account information from the authorization system.

7. The system of claim 6, wherein the acts further comprise:
  generating, by the first client, a client-specific resource based on the lower sensitivity account information; and
  presenting, by a second client, the lower sensitivity account information and the generated client-specific resource.

8. A non-transitory computer-readable storage medium having stored therein program instructions of one or more software programs, wherein the program code when executed by at least one processing device cause the at least one processing device to perform a method comprising:
  assigning, by one or more processing units of an authorization system during an access session, a first token and a second token to a first client to authorize the first client to access end user account information stored at a resource owner, wherein:
    the end user account information comprises higher sensitivity account information and lower sensitivity account information;
    the end user account information is hosted by a device separated from the authorization system;
    the first token depends on the access session between the authorization system and the first client, and wherein a scope of authorization of the first token is determined by receiving a set of authorization options from the resource owner, the set of authorization options represented graphically within a user interface and selectable by a user;
    the second token associated with the lower sensitivity account information, wherein the second token is independent from the access session, and wherein the second token is stored, according to the first client, in a table of the authorization system;
    a lifetime of the second token is set to be longer than a lifetime of the first token; and
    the first token is prioritized over the second token until the access session is terminated:
  in response to the assigning of the first token and the second token:
    obtaining, by a resource collector module of the authorization system, the lower sensitivity account information;
    storing, in a resource database of the authorization system, the lower sensitivity account information; and
  in response to receiving a request from the first client after the session has expired, the request including the second token, and in response to validating the first client against the table, transmitting, from the resource database of the authorization system, the stored lower sensitivity account information to the first client.

9. The non-transitory computer-readable storage medium of claim 8, wherein the method further comprises:
  determining whether a further client has been granted by the resource owner to access the lower sensitivity account information;
  in response to determining that the further client has been granted, sharing, by the first client, the second token with the further client; and
  storing the second token, according to the further client, in the table of the authorization system, wherein the second token authorizes access to the at least some of the end user account information.

10. The non-transitory computer-readable storage medium of claim 9, wherein the method further comprises:
  in response to receiving from the further client a further request including the second token and validating the further client against the table, providing the lower sensitivity account information to the further client.

11. The non-transitory computer-readable storage medium of claim 9, wherein the method further comprises:
  receiving a request from the resource owner to revoke access to the lower sensitivity account information by the further client;
  updating the table of the authorization system to reflect the revoked access for the further client without invalidating the second token;
  receiving, from the further client, an access request for the at least some of the end user account information; and
  in response to querying the table and determining the further client is not authorized, denying access to the lower sensitivity account information.

12. The non-transitory computer-readable storage medium of claim 8, wherein:
  the end user account information is hosted by a device separated from the authorization system.

13. The non-transitory computer-readable storage medium of claim 12, wherein method further comprises:
  in response to a trigger to update the lower sensitivity account information, requesting the updated at least some of the end user account information from the device;
  obtaining the updated lower sensitivity account information from the device; and storing the updated lower sensitivity account information in the resource database.

14. The method of claim 2, wherein, in response to receiving from the further client a further request including the second token and validating the second token against the table, determining the further client is revoked; and
denying the lower sensitivity account information to the further client.

* * * * *